(12) United States Patent
Stanfill et al.

(10) Patent No.: US 8,706,667 B2
(45) Date of Patent: Apr. 22, 2014

(54) TRANSACTIONAL GRAPH-BASED COMPUTATION WITH ERROR HANDLING

(75) Inventors: Craig W. Stanfill, Lincoln, MA (US); Joseph Skeffington Wholey, III, Belmont, MA (US)

(73) Assignee: Ab Initio Technology LLC, Lexington, MA (US)

( * ) Notice: Subject to any disclaimer, the term of this patent is extended or adjusted under 35 U.S.C. 154(b) by 704 days.

(21) Appl. No.: 12/180,141

(22) Filed: Jul. 25, 2008

(65) Prior Publication Data
US 2009/0030863 A1    Jan. 29, 2009

Related U.S. Application Data

(60) Provisional application No. 60/952,075, filed on Jul. 26, 2007.

(51) Int. Cl.
*G06F 17/00* (2006.01)
*G06N 5/00* (2006.01)
*G06N 99/00* (2010.01)

(52) U.S. Cl.
CPC .................................. *G06N 99/005* (2013.01)
USPC ........................................................ 706/45

(58) Field of Classification Search
CPC ....... G06N 99/005; G06N 5/04; G06Q 10/10; G06Q 10/06; G06Q 30/02
USPC .................................................... 706/45, 62
See application file for complete search history.

(56) References Cited

U.S. PATENT DOCUMENTS

| | | | | |
|---|---|---|---|---|
| 3,662,343 | A | * | 5/1972 | Goldstein et al. ............. 235/381 |
| 3,662,401 | A | | 5/1972 | Collins et al. |
| 4,922,418 | A | | 5/1990 | Dolecek |
| 4,972,314 | A | | 11/1990 | Getzinger et al. |
| 5,127,104 | A | * | 6/1992 | Dennis .......................... 712/201 |
| 5,276,899 | A | | 1/1994 | Neches |
| 5,280,619 | A | | 1/1994 | Wang |
| 5,301,336 | A | * | 4/1994 | Kodosky et al. ............. 715/846 |
| 5,323,452 | A | | 6/1994 | Dickman et al. |
| 5,333,319 | A | * | 7/1994 | Silen ............................. 718/103 |

(Continued)

FOREIGN PATENT DOCUMENTS

| | | |
|---|---|---|
| JP | 64-013189 | 1/1989 |
| JP | 06-236276 | 8/1994 |

(Continued)

OTHER PUBLICATIONS

Vajracharya et al, "Asynchronous Resource Management", Proceedings 15th International Parallel and Distributed Processing Symposium, Issue Date: Apr. 2001, Date of Current Version: Aug. 7, 2002.*

(Continued)

*Primary Examiner* — Lut Wong
*Assistant Examiner* — Ilya Traktovenko
(74) *Attorney, Agent, or Firm* — Fish & Richardson P.C.

(57) ABSTRACT

Processing transactions using graph-based computations includes determining that at least one of a plurality of graph elements of a computation graph of a set of one or more computation graphs includes a computation to be performed for a given transaction, associating the given transaction with an instance of the computation graph that includes reusable computation elements associated with respective graph elements, and executing the graph to perform the computation.

114 Claims, 8 Drawing Sheets

(56) References Cited

U.S. PATENT DOCUMENTS

| | | | |
|---|---|---|---|
| 5,357,632 A | 10/1994 | Pian et al. | |
| 5,495,590 A | 2/1996 | Comfort et al. | |
| 5,630,047 A | 5/1997 | Wang | |
| 5,692,168 A | 11/1997 | McMahan | |
| 5,701,400 A | 12/1997 | Amado | |
| 5,712,971 A | 1/1998 | Stanfill et al. | |
| 5,745,778 A | 4/1998 | Alfieri | |
| 5,802,267 A | 9/1998 | Shirakihara et al. | |
| 5,805,462 A | 9/1998 | Poirot et al. | |
| 5,857,204 A | 1/1999 | Lordi et al. | |
| 5,923,832 A | 7/1999 | Shirakihara et al. | |
| 5,924,095 A * | 7/1999 | White | 1/1 |
| 5,930,794 A | 7/1999 | Linenbach et al. | |
| 5,933,640 A | 8/1999 | Dion | |
| 5,966,072 A * | 10/1999 | Stanfill et al. | 340/440 |
| 5,999,729 A | 12/1999 | Tabloski, Jr. et al. | |
| 6,006,242 A | 12/1999 | Poole et al. | |
| 6,012,094 A | 1/2000 | Leymann | |
| 6,014,670 A | 1/2000 | Zamanian et al. | |
| 6,016,516 A | 1/2000 | Horikiri | |
| 6,032,158 A | 2/2000 | Mukhopadhhyay et al. | |
| 6,038,558 A | 3/2000 | Powers et al. | |
| 6,044,211 A | 3/2000 | Jain | |
| 6,044,374 A | 3/2000 | Nesamoney et al. | |
| 6,044,394 A | 3/2000 | Cadden et al. | |
| 6,088,716 A | 7/2000 | Stanfill et al. | |
| 6,145,017 A * | 11/2000 | Ghaffari | 710/5 |
| 6,173,276 B1 | 1/2001 | Kant et al. | |
| 6,208,345 B1 | 3/2001 | Sheard et al. | |
| 6,256,637 B1 | 7/2001 | Venkatesh et al. | |
| 6,259,988 B1 | 7/2001 | Galkowski et al. | |
| 6,272,650 B1 | 8/2001 | Meyer et al. | |
| 6,301,601 B1 | 10/2001 | Helland | |
| 6,314,114 B1 | 11/2001 | Coyle et al. | |
| 6,324,437 B1 | 11/2001 | Frankel et al. | |
| 6,330,008 B1 | 12/2001 | Razdow et al. | |
| 6,339,775 B1 | 1/2002 | Zamanian et al. | |
| 6,400,996 B1 | 6/2002 | Hoffberg et al. | |
| 6,401,216 B1 | 6/2002 | Meth et al. | |
| 6,437,796 B2 | 8/2002 | Sowizral et al. | |
| 6,449,711 B1 | 9/2002 | Week | |
| 6,480,876 B2 | 11/2002 | Rehg et al. | |
| 6,496,961 B2 | 12/2002 | Gupta et al. | |
| 6,538,651 B1 | 3/2003 | Hayman et al. | |
| 6,584,581 B1 | 6/2003 | Bay et al. | |
| 6,608,628 B1 | 8/2003 | Ross et al. | |
| 6,611,862 B2 | 8/2003 | Reisman | |
| 6,651,234 B2 | 11/2003 | Gupta et al. | |
| 6,654,907 B2 | 11/2003 | Stanfill et al. | |
| 6,658,464 B2 | 12/2003 | Reisman | |
| 6,715,145 B1 | 3/2004 | Bowman-Amuah | |
| 6,728,879 B1 | 4/2004 | Atkinson | |
| 6,813,761 B1 | 11/2004 | Das et al. | |
| 6,816,825 B1 | 11/2004 | Ashar et al. | |
| 6,832,369 B1 | 12/2004 | Kryka et al. | |
| 6,848,100 B1 | 1/2005 | Wu et al. | |
| 6,879,946 B2 | 4/2005 | Rong et al. | |
| 7,062,483 B2 | 6/2006 | Ferrari et al. | |
| 7,082,604 B2 | 7/2006 | Schneiderman | |
| 7,085,426 B2 | 8/2006 | August | |
| 7,103,597 B2 | 9/2006 | McGovern | |
| 7,103,620 B2 | 9/2006 | Kunz et al. | |
| 7,130,484 B2 | 10/2006 | August | |
| 7,137,116 B2 | 11/2006 | Parkes et al. | |
| 7,164,422 B1 | 1/2007 | Wholey et al. | |
| 7,165,030 B2 | 1/2007 | Yi et al. | |
| 7,167,850 B2 | 1/2007 | Stanfill | |
| 7,316,001 B2 | 1/2008 | Gold et al. | |
| 7,356,819 B1 | 4/2008 | Ricart et al. | |
| 7,398,514 B2 | 7/2008 | Russell | |
| 7,417,645 B2 | 8/2008 | Beda et al. | |
| 7,457,984 B2 | 11/2008 | Kutan | |
| 7,467,383 B2 | 12/2008 | Inchingolo et al. | |
| 7,505,975 B2 | 3/2009 | Luo | |
| 7,577,628 B2 | 8/2009 | Stanfill | |
| 7,636,699 B2 | 12/2009 | Stanfill | |
| 7,716,630 B2 | 5/2010 | Wholey et al. | |
| 7,756,940 B2 | 7/2010 | Sagawa | |
| 7,840,949 B2 | 11/2010 | Schumacher et al. | |
| 7,870,556 B2 | 1/2011 | Wholey et al. | |
| 7,877,350 B2 | 1/2011 | Stanfill et al. | |
| 7,979,479 B2 | 7/2011 | Staebler et al. | |
| 8,566,641 B2 | 10/2013 | Douros et al. | |
| 2001/0055019 A1 | 12/2001 | Sowizral et al. | |
| 2002/0080181 A1 | 6/2002 | Razdow et al. | |
| 2002/0087921 A1* | 7/2002 | Rodriguez | 714/56 |
| 2002/0091747 A1 | 7/2002 | Rehg et al. | |
| 2002/0091748 A1 | 7/2002 | Rehg et al. | |
| 2002/0111876 A1 | 8/2002 | Rudraraju et al. | |
| 2002/0129340 A1 | 9/2002 | Tuttle | |
| 2002/0147745 A1 | 10/2002 | Houben et al. | |
| 2002/0184616 A1 | 12/2002 | Chessell et al. | |
| 2003/0004771 A1 | 1/2003 | Yaung | |
| 2003/0023413 A1 | 1/2003 | Srinivasa | |
| 2003/0033432 A1 | 2/2003 | Simpson et al. | |
| 2003/0091055 A1 | 5/2003 | Craddock et al. | |
| 2003/0126240 A1 | 7/2003 | Vosseler | |
| 2003/0204804 A1* | 10/2003 | Petri et al. | 714/746 |
| 2004/0006745 A1 | 1/2004 | Van Heldan et al. | |
| 2004/0041838 A1 | 3/2004 | Adusumilli et al. | |
| 2004/0073529 A1* | 4/2004 | Stanfill | 706/45 |
| 2004/0093559 A1 | 5/2004 | Amaru et al. | |
| 2004/0098452 A1 | 5/2004 | Brown et al. | |
| 2004/0107414 A1 | 6/2004 | Bronicki et al. | |
| 2004/0111469 A1 | 6/2004 | Manion et al. | |
| 2004/0148373 A1 | 7/2004 | Childress et al. | |
| 2004/0177099 A1 | 9/2004 | Ganesh et al. | |
| 2004/0205726 A1 | 10/2004 | Chedgey et al. | |
| 2004/0207665 A1 | 10/2004 | Mathur | |
| 2004/0210831 A1* | 10/2004 | Feng et al. | 715/502 |
| 2004/0225657 A1 | 11/2004 | Sarkar | |
| 2004/0260590 A1 | 12/2004 | Golani et al. | |
| 2005/0021689 A1 | 1/2005 | Marvin et al. | |
| 2005/0034112 A1 | 2/2005 | Stanfill | |
| 2005/0039176 A1 | 2/2005 | Fournie | |
| 2005/0059046 A1 | 3/2005 | Labrenz et al. | |
| 2005/0086360 A1 | 4/2005 | Mamou et al. | |
| 2005/0097561 A1 | 5/2005 | Schumacher et al. | |
| 2005/0102670 A1* | 5/2005 | Bretl et al. | 718/1 |
| 2005/0144277 A1 | 6/2005 | Flurry et al. | |
| 2005/0144596 A1 | 6/2005 | McCullough et al. | |
| 2005/0149935 A1 | 7/2005 | Benedetti | |
| 2005/0177531 A1 | 8/2005 | Bracewell | |
| 2005/0193056 A1 | 9/2005 | Schaefer et al. | |
| 2005/0216421 A1 | 9/2005 | Barry et al. | |
| 2005/0240621 A1 | 10/2005 | Robertson et al. | |
| 2005/0262470 A1 | 11/2005 | Gavrilov | |
| 2005/0289527 A1 | 12/2005 | Illowsky et al. | |
| 2006/0085462 A1 | 4/2006 | Todd | |
| 2006/0095722 A1 | 5/2006 | Biles et al. | |
| 2006/0098017 A1* | 5/2006 | Tarditi et al. | 345/505 |
| 2006/0206872 A1 | 9/2006 | Krishnaswamy | |
| 2006/0282474 A1 | 12/2006 | MacKinnon | |
| 2006/0294150 A1 | 12/2006 | Stanfill et al. | |
| 2006/0294459 A1 | 12/2006 | Davis et al. | |
| 2007/0011668 A1 | 1/2007 | Wholey et al. | |
| 2007/0022077 A1 | 1/2007 | Stanfill | |
| 2007/0035543 A1 | 2/2007 | David et al. | |
| 2007/0094211 A1 | 4/2007 | Sun et al. | |
| 2007/0118839 A1 | 5/2007 | Berstis et al. | |
| 2007/0139441 A1 | 6/2007 | Lucas et al. | |
| 2007/0143360 A1 | 6/2007 | Harris et al. | |
| 2007/0150429 A1 | 6/2007 | Huelsman et al. | |
| 2007/0174185 A1 | 7/2007 | McGovern | |
| 2007/0179923 A1 | 8/2007 | Stanfill | |
| 2007/0239766 A1 | 10/2007 | Papaefstathiou et al. | |
| 2007/0271381 A1 | 11/2007 | Wholey et al. | |
| 2007/0285440 A1 | 12/2007 | MacInnis et al. | |
| 2008/0049022 A1 | 2/2008 | Sherb et al. | |
| 2008/0126755 A1 | 5/2008 | Wu et al. | |
| 2008/0288608 A1 | 11/2008 | Johnson | |
| 2008/0294615 A1 | 11/2008 | Furuya et al. | |
| 2009/0030863 A1 | 1/2009 | Stanfill et al. | |
| 2009/0064147 A1 | 3/2009 | Beckerle et al. | |

(56) References Cited

U.S. PATENT DOCUMENTS

| | | |
|---|---|---|
| 2009/0083313 A1 | 3/2009 | Stanfill et al. |
| 2009/0182728 A1 | 7/2009 | Anderson |
| 2009/0193417 A1 | 7/2009 | Kahlon |
| 2009/0224941 A1 | 9/2009 | Kansal et al. |
| 2009/0327196 A1 | 12/2009 | Studer et al. |
| 2010/0070955 A1 | 3/2010 | Kahlon |
| 2010/0169137 A1 | 7/2010 | Jastrebski et al. |
| 2010/0174694 A1 | 7/2010 | Staebler et al. |
| 2010/0180344 A1 | 7/2010 | Malyshev et al. |
| 2010/0211953 A1 | 8/2010 | Wakeling et al. |
| 2010/0218031 A1 | 8/2010 | Agarwal et al. |
| 2010/0281488 A1 | 11/2010 | Krishnamurthy et al. |
| 2011/0078500 A1 | 3/2011 | Douros et al. |
| 2011/0093433 A1 | 4/2011 | Stanfill et al. |
| 2012/0054255 A1 | 3/2012 | Buxbaum et al. |

FOREIGN PATENT DOCUMENTS

| | | | |
|---|---|---|---|
| JP | 08-278892 | 10/1996 | |
| JP | 08-305576 | 11/1996 | |
| JP | 63-231613 | 9/1998 | |
| JP | 11-184766 | 7/1999 | |
| JP | 2000-99317 | 4/2000 | |
| JP | 2002-229943 | 8/2002 | ............... G06F 15/00 |
| JP | 2005-317010 | 11/2005 | ............... G06F 12/00 |
| JP | 2006-504160 | 2/2006 | |
| WO | WO 98/00791 | 1/1998 | |
| WO | WO 02/11344 | 2/2002 | |
| WO | WO2005/001687 | 1/2005 | |
| WO | WO 2005/086906 | 9/2005 | |
| WO | WO 2008/124319 | 10/2008 | |
| WO | WO 2009/039352 | 3/2009 | |

OTHER PUBLICATIONS

Krsul et al, "VMPlants: Providing and Managing Virtual Machine Execution Environments for Grid Computing", Proceedings of the ACM/IEEE SC2004 Conference on Supercomputing, 2004, Issue Date: Nov. 6-12, 2004, Date of Current Version: Mar. 21, 2005.*

Babaoglu, O et al., "Mapping parallel computations onto distributed systems in Paralex" Compuero '91. Advanced Computer Technology, Reliable Systems and Applications. $5^{th}$ Annual European Computer Conference. Proceedings. Bologna, Italy May 13-16, 1991, Los Alamitos, CA, USA, IEEE Comput. Soc, US, May 13, 1991, pp. 123-130.

Baer, J.L. et al., "Legality and Other Properties of Graph Models of Computations." Journal of the Association for Computing Machinery, vol. 17, No. 3, Jul. 1970, pp. 543-554.

Bookstein, A. et al., "Modeling Word Occurrences for the Compression of Concordances." ACM Transactions on Information Systems, vol. 15, No. 3, Jul. 1997, pp. 254-290.

Cytron, Ron et al., "Efficiently Computing Static Single Assignment Form and the Control Dependence Graph." ACM Transactions on Programming Languages and Systems, vol. 13, No. 4, Oct. 1991, pp. 451-490.

Ebert, Jurgen et al., "A Declarative Approach to Graph-Based Modeling." Workshop on Graph-Theoretic Concepts in Computer Science, 1994, pp. 1-19.

Gamma et al. "Design Patterns: Elements of Reusable Object-Oriented Software", Sep. 1999.

International Search Report & Written Opinion issued in PCT application No. PCT/US08/71206, mailed Oct. 22, 2008, 12 pages.

Jawadi, Ramamohanrao et al., "A Graph-based Transaction Model for Active Databases and its Parallel Implementation." U. Florida Tech. Rep TR94-0003, 1994, pp. 1-29.

Kebschull, U. et al., "Efficient Graph-Based Computation and Manipulation of Functional Decision Diagrams." University of Tubingen, 1993 IEEE, pp. 278-282.

Li, Xiqing et al., "A Practical External Sort for Shared Disk MPPs." Proceedings of Supercomputing '93, 1993, 24 pages.

Martin, David et al., "Models of Computations and Systems—Evaluation of Vertex Probabilities in Graph Models of Computations." Journal of the Association for Computing Machinery, vol. 14, No. 2, Apr. 1967, pp. 281-299.

Ou, Chao-Wei et al., "Architecture-Independent Locality-Improving Transformations of Computational Graphs Embedded in κ-Dimensions." Proceedings of the $9^{th}$ International Conference on Supercomputing, 1995, pp. 289-298.

"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02 >, 5 pages.

Stanfill, Craig, "Massively Parallel Information Retrieval for Wide Area Information Servers." 1991 IEEE International Conference on Systems, Man and Cybernetics, Oct. 1991, pp. 679-682.

Stanfill, Craig et al., "Parallel Free-Text Search on the Connection Machine System." Communications of the ACM, vol. 29, No. 12, Dec. 1986, pp. 1229-1239.

Stanfill, Craig, "The Marriage of Parallel Computing and Information Retrieval." IEE Colloquium on Parallel Techniques for Information Retrieval, Apr. 1989, 5 pages.

Wah, B.W. et al., "Report on Workshop on High Performance Computing and Communications for Grand Challenge Applications: Computer Vision, Speech and Natural Language Processing, and Artificial Intelligence." IEEE Transactions on Knowledge and Data Engineering, vol. 5, No. 1, Feb. 1993, 138-154.

Burch, J.R. et al., "Sequential circuit verification using symbolic model checking." In Design Automation Conference, 1990, Proceedings of the $27^{th}$ ACM/IEEE. Jun. 24-28, 1990, pp. 46-51.

Guyer et al., "Finding Your Cronies: Static Analysis for Dynamic Object Colocation." Oct. 2004, ACM, pp. 237-250.

Grove et al., "A Framework for Call Graph Construction Algorithms." Nov. 2001, ACM TOPLAS, vol. 23, Issue 6, pp. 685-746.

Herniter, Marc E., "Schematic Capture with MicroSim PSpice," $2^{nd}$ Edition, Prentice Hall, Upper Saddle River, N.J., 1996, pp. 51-52, 255-280, 292-297.

International Search Report & Written Opinion issued in PCT application No. PCT/US01/23552, mailed Jan. 24, 2002, 5 pages.

International Search Report & Written Opinion issued in PCT application No. PCT/US06/24957, dated Jan. 17, 2008, 14 pages.

International Search Report & Written Opinion issued in PCT application No. PCT/US07/75576, mailed Sep. 16, 2008, 13 pages.

International Search Report & Written Opinion received in PCT application No. PCT/US10/24036, mailed Mar. 23, 2010, 11 pages.

Just et al., "Review and Analysis of Synthetic Diversity for Breaking Monocultures." Oct. 2004, ACM, pp. 23-32.

Krahmer et al., "Graph-Based Generation of Referring Expressions." Mar. 2003, MIT Press, vol. 29, No. 1, pp. 53-72.

Supplemental European Search Report issued in application No. EP07813940, dated Nov. 26, 2009, 7 pages.

European Search Report issued in application No. EP10003554, dated Sep. 24, 2010, 7 pages.

Supplemental European Search Report issued in application No. EP08796632, dated Sep. 24, 2010, 6 pages.

International Search Report & Written Opinion issued in PCT application No. PCT/US10/49966, dated Nov. 23, 2010, 8 pages.

International Search Report & Written Opinion received in PCT application No. PCT/US2011/040440, mailed Oct. 12, 2011, 13 pages.

Control-M; New Dimension Software. User Manual. New Dimension Software Ltd., 1999.

Romberg, M., "UNICORE: Beyond Web-based Job-Submission," Proceedings of the 42nd Cray User Group Conference, Noordwijk (May 22-26, 2000).

"Unicenter AutoSys Job Management," Computer Associates, Copyright 2001.

European Search Report issued in application No. EP10741775, dated Nov. 14, 2012, 4 pages.

Russell, Nick, et al., "Workflow Control-Flow Patterns a Revised View," Workflow Patterns Initiative, 2006, pp. 1-134.

van der Aalst, W.M.P., et al., "Workflow Patterns," Distributed and Parallel Databases, 14, 5-51, 2003.

(56) References Cited

OTHER PUBLICATIONS

Japanese Office Action, with English Translation, JP application No. 2011-000948, mailed Jan. 8, 2013, 11 pages.
Japanese Office Action, with English Translation, JP application No. 2008-519474, mailed Sep. 25, 2012, 8 pages.
Shoten, Iwanami, "Encyclopedic Dictionary of Computer Science," (with English Translation), May 25, 1990, p. 741.
Japanese Office Action, with English Translation, JP application No. 2009-523997, mailed Oct. 23, 2012, 7 pages.
Supplemental European Search Report issued in application No. EP06774092, dated Dec. 19, 2012, 5 pages.
"Topological sorting," Wikipedia, accessed Dec. 10, 2012, 2 pages.
Japanese Office Action, with English Translation, JP application No. 2010-518415, mailed Feb. 21, 2013, 11 pages.
"Visual Lint: Squash Bugs Early with Interactive C/C++, C# and Java Code Analysis for Microsoft Visual Studio and Eclipse," [retrieved from the internet Dec. 3, 2012: www.riverblade.co.uk/products/visual_lint.] (2 pages).
Transaction History, U.S. Appl. No. 09/627,252, Jul. 8, 2013, 2 pages.
Transaction History, U.S. Appl. No. 10/268,509, Jul. 8, 2013, 2 pages.
Transaction History, U.S. Appl. No. 11/467,724, Jul. 8, 2013, 2 pages.
Transaction History, U.S. Appl. No. 11/733,579, Jul. 8, 2013, 2 pages.
Transaction History, U.S. Appl. No. 11/169,014, Jul. 8, 2013, 2 pages.
Transaction History, U.S. Appl. No. 11/167,902, Jul. 8, 2013, 3 pages.
Transaction History, U.S. Appl. No. 12/977,545, Jul. 8, 2013, 6 pages.
Transaction History, U.S. Appl. No. 11/836,349, Jul. 8, 2013, 4 pages.
Transaction History, U.S. Appl. No. 12/704,998, Jul. 8, 2013, 2 pages.
Transaction History, U.S. Appl. No. 13/161,010, Jul. 8, 2013, 2 pages.
Transaction History, U.S. Appl. No. 12/638,588, Jul. 8, 2013, 3 pages.
Transaction History, U.S. Appl. No. 13/678,921, Jul. 8, 2013, 1 page.
Transaction History, U.S. Appl. No. 13/678,928, Jul. 8, 2013, 1 page.
Transaction History, U.S. Appl. No. 13/936,330, Aug. 7, 2013, 1 page.
Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.
Evripidou, Paraskevas, et al., "Incorporating input/output operations into dynamic data-flow graphs," Parallel Computing 21 (1995) 1285-1311.
Extended European Search Report, EP 12165575, mailed May 10, 2013, 9 pages.
Frankl, Phyllis G., et al., "An Applicable Family of Data Flow Testing Criteria," IEEE Transactions on Software Engineering, vol. 14, No. 10, Oct. 1988, pp. 1483-1498.
Whiting, Paul G., et al., "A History of Data-Flow Languages," IEEE Annals of the History of Computing, vol. 16, No. 4, 1994, pp. 38-59.
Japanese Office Action for Japanese Application No. 2010-518415 dated Nov. 18, 2013 (11 pages).

\* cited by examiner

TRANSACTIONAL GRAPH-BASED COMPUTATION WITH ERROR HANDLING

CROSS-REFERENCE TO RELATED APPLICATIONS

This application claims priority to U.S. Application Ser. No. 60/952,075, filed on Jul. 26, 2007, incorporated herein by reference.

BACKGROUND

This invention relates to execution of graph-based computations.

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS. One approach to executing a graph-based computation is to execute a number of processes, each associated with a different vertex of the graph, and to establish communication paths between the processes according to the links of the graph. For example, the communication paths can use TCP/IP or UNIX domain sockets, or use shared memory to pass data between the processes.

SUMMARY

In one aspect, in general, a method for processing transactions using graph-based computations includes determining that at least one of a plurality of graph elements of a computation graph of a set of one or more computation graphs includes a computation to be performed for a given transaction, associating the given transaction with an instance of the computation graph that includes reusable computation elements associated with respective graph elements, and executing the graph to perform the computation.

Aspects can include one or more of the following features.

At least some instances of the graphs in the set of computation graphs share one or more of the computation elements.

The computation elements include computations executed by at least one of an operating system process and a process thread.

The graph elements include vertices of the computation graphs.

Associating the transaction with an instance of the computation graph includes assigning a computation element corresponding to each graph element in the computation graph to the instance of the computation graph before beginning executing the graph elements.

Associating the transaction with an instance of the computation graph includes assigning a computation element corresponding to a graph element in the computation graph to the instance of the computation graph after executing another graph element using a computation element already assigned to the instance.

At least two of the graph elements use a common resource, and executing the graph to perform the computation includes assigning each of the graph elements using the common resource to a single computation element.

The single computation element is already initiated when the graph elements are assigned to the computation element.

The common resource includes a database.

The common resource includes a specific port.

Processing the transaction includes receiving a request for the transaction.

The method also includes determining that the same computation graph is associated with a computation to be performed for a second transaction, associating the second transaction with a second instance of the computation graph, and executing the second instance of the graph to perform the computation for the second transaction.

The computations for transactions performed using different instances of computation graphs are performed in a time-interleaved manner.

Multiple transactions are processed concurrently.

Each transaction is associated with one or more work elements that are processed according to the corresponding computation graph.

At least some transactions are each associated with one work element that is processed according to the corresponding computation graph.

The method further includes forming multiple instances of at least some of the computation graphs.

The method further includes identifying that an error has occurred in the performing of a computation for one of the transactions, and continuing the performing of a computation for another one of the transactions.

The processing of a first transaction of the plurality of transactions starts at a first time, and the processing of a second transaction of the plurality of transactions starts at a second time later than the first time, the method further includes completing the performing of the computation for the second transaction before completing the performing of the computation for the first transaction.

In another aspect, in general, a system for processing transactions using graph-based computations includes means for determining that at least one of a plurality of graph elements of a computation graph of a set of one or more computation graphs includes a computation to be performed for a transaction, means for associating the given transaction with an instance of the computation graph that includes reusable computation elements associated with respective graph elements, and means for executing the graph to perform the computation.

In another aspect, in general, a computer-readable medium stores a computer program for processing transactions using graph-based computations. The computer program includes instructions for causing a computer system to: determine that at least one of a plurality of graph elements of a computation graph of a set of one or more computation graphs includes a computation to be performed for a given transaction, associate the given transaction with an instance of the computation graph that includes reusable computation elements associated with respective graph elements, and execute the graph to perform the computation.

In another aspect, in general, a method for processing graph-based computations includes: within a graph including vertices representing graph components that process work elements according to links joining the vertices, providing at least one error-handling graph component configured to provide error information to a process external to the graph, and processing data, including, in response to a graph component encountering an error while processing, redirecting processing to the error-handling graph component including directing at least some of the work elements to the error-handling component according to at least one link to a vertex representing the error-handling component.

Aspects can include one or more of the following features.

Redirecting processing to the error-handling graph component includes removing work elements from at least one input queue.

Redirecting processing to the error-handling graph component includes processing the work elements directed to the error-handling graph component.

Processing the work elements directed to the error-handling graph component includes rolling back changes to a database made prior to the error.

Processing the data includes, for graph components not included in handling the error, discarding work elements directed to those graph components.

A sub-graph is provided, the sub-graph including an error-handling sub-graph component configured to provide an error code as an output of the sub-graph.

If output provided by the sub-graph indicates that an error occurred in the sub graph, processing is redirected to the error-handling graph component.

Redirecting processing to the error-handling graph component includes communicating, from the graph component that encountered the error, to the error-handling graph component, work elements that the graph component was processing when the error occurred.

The work elements are communicated according to the link to the vertex representing the error-handling component.

Redirecting processing to the error-handling graph component includes communicating, from the graph component that encountered the error, to the error-handling graph component, reporting information about the error.

The reporting information is communicated according to an implicit connection between the graph component that encountered the error and the error-handling component.

The implicit connection is revealed as an explicit link between a vertex representing the graph component that encountered the error and a vertex representing the error-handling component in response to a user request.

Providing the error-handling graph component includes providing a plurality of error-handling graph components, and redirecting processing to the error-handling graph component includes selecting an error-handling graph component based on output provided from the graph component that encountered the error.

Processing the data also includes, if a graph component encounters an error while processing, outputting an identification of a work element that caused the error.

Processing includes: enabling a first component of the graph; disabling the error-handling component; and for each component downstream of the first component other than the error-handling component, enabling the component if a component immediately upstream of the component is enabled.

Redirecting processing to the error-handling graph component includes: stopping execution of each enabled graph component, disabling the component that encountered the error; enabling the error-handling component; disabling components downstream of the component that encountered the error that are not downstream of the error-handling component; and enabling components upstream of the error-handling component.

Redirecting processing to the error-handling graph component includes, where the error occurred in a first component, if the error occurs under a first condition, directing process flow from the first component to a first error-handling component upstream of the first component, and if the error occurs under a second condition, directing process flow from the first component to a second error-handling component downstream of the first component.

The first condition is that a counter is below a limit.

The second condition is that a counter is above a limit.

Redirecting processing to the error-handling graph component also includes enabling a set of graph components, the set having been determined prior to the error.

In another aspect, in general, a system for processing graph-based computations includes, within a graph including vertices representing graph components that process work elements according to links joining the vertices, means for providing at least one error-handling graph component configured to provide error information to a process external to the graph, and means for processing data, including, in response to a graph component encountering an error while processing, redirecting processing to the error-handling graph component including directing at least some of the work elements to the error-handling component according to at least one link to a vertex representing the error-handling component.

In another aspect, in general, a computer-readable medium stores a computer program for processing graph-based computations. The computer program includes instructions for causing a computer system to: within a graph including vertices representing graph components that process work elements according to links joining the vertices, provide at least one error-handling graph component configured to provide error information to a process external to the graph, and process data, including, in response to a graph component encountering an error while processing, redirecting processing to the error-handling graph component including directing at least some of the work elements to the error-handling component according to at least one link to a vertex representing the error-handling component.

Other features and advantages of the invention are apparent from the following description, and from the claims.

DESCRIPTION

1. Overview

This application is related to U.S. patent application Ser. Nos. 10/268,509, Startup and Control of Graph-Based Computation, filed Oct. 10, 2002, and 11/733,579, Transactional Graph-Based Computation, filed Apr. 10, 2007, which is a continuation of application Ser. No. 10/268,509. Both are incorporated herein by reference.

Figure 1:
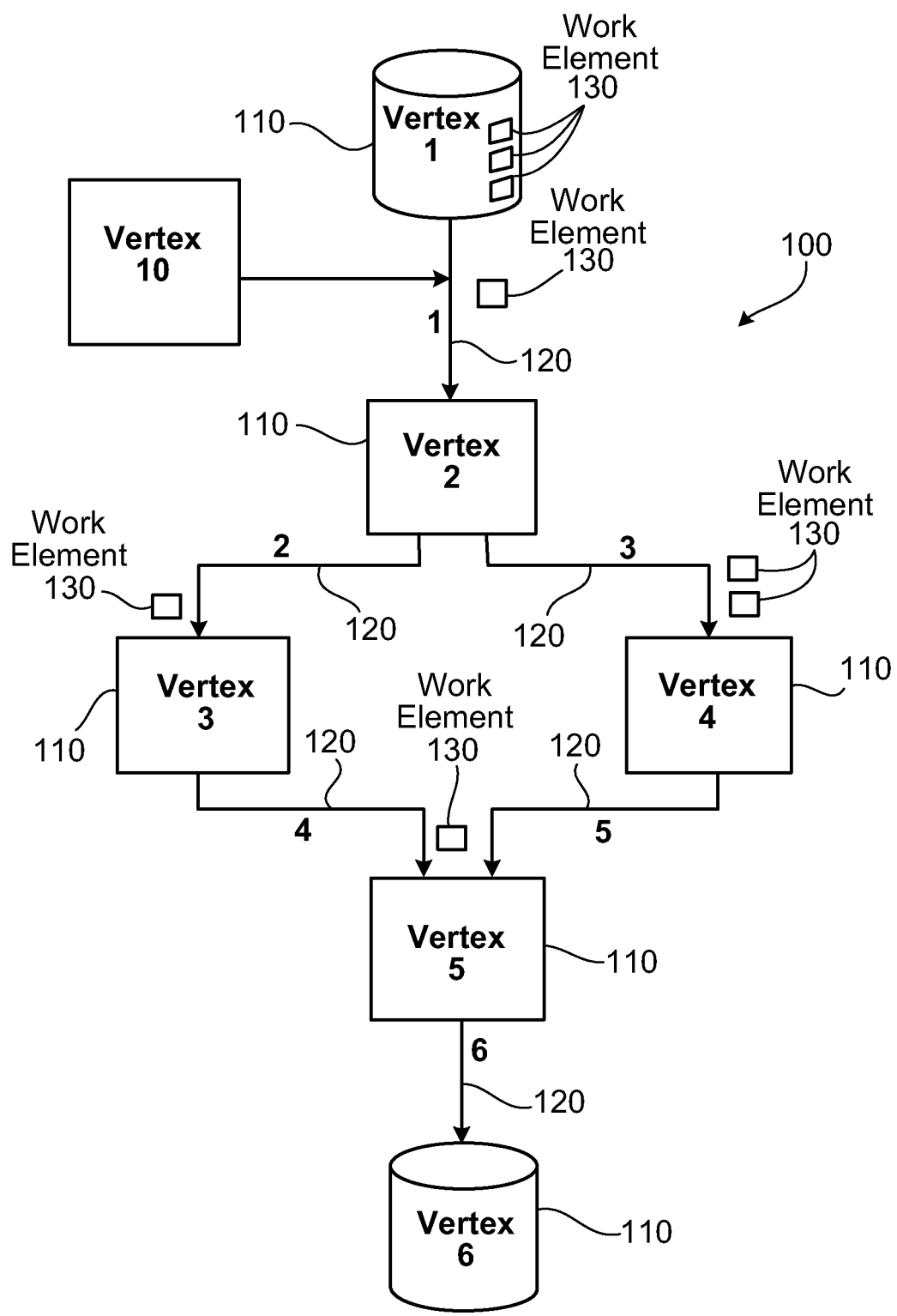
FIG. 1 is a diagram that illustrates an instance of graph-based computation.

The system described below implements a method for executing computations that are defined in terms of computation graphs. Referring to FIG. 1, an example of a computation graph 100 includes a number of vertices 110 that are joined by unidirectional links 120. In the example shown in FIG. 1, vertices 110 are numbered from 1 to 6, and links 120 are also numbered from 1 to 6. Computation graph 100 processes a work flow that is made up of a series of work elements 130, such as individual transactions that are processed according to a computation graph associated with a transaction processing system. A transaction may be composed of multiple work elements. Each vertex is associated with a portion of the computation defined by the overall computation graph. In this example, vertex 1 provides access to storage for an initial series of work elements 130 associated with one or more transactions, and passes that series on its output link 1. Processes that implement the computation associated with each of the vertices process the work elements 130 in turn, and typically produce a work element on one or more of the output links of that vertex.

A process for a vertex is ready to run when at least one work element is queued at each of the vertex's inputs. As illustrated in FIG. 1, a work element 130 is in transit on link 1, a work element is queued ready for processing at vertex 3, and two work elements are queued for processing at vertex 4. Therefore, the processes for vertex 3 and vertex 4 are ready to run to process a queued work element. As illustrated, vertex 5 has a work element queued on one of its inputs, link 4, but not on the other input, link 5. Therefore the process associated with vertex 5 is not ready to run.

In some examples, a work flow may include work elements from multiple transactions (i.e., a first set of one or more work elements correspond to a first transaction, a second set of one or more elements correspond to a second transaction, etc.). A transaction can include a set of work elements representing actions that are all to be processed as a set, such that if one action fails, none should be carried out. Multiple instances of a graph may be used to process multiple transactions, and multiple instances of individual graph components (represented by vertices of a computation graph) may be created as needed by implementing computations of a graph component with a reusable computation element (e.g., an operating system process). By associating different transactions with different respective instances of graphs, multiple transactions can be processed concurrently. By enabling multiple computation elements to be assigned as needed to graph instances, efficient resource sharing can be realized by having a computation element be used by one graph instance and reused by another graph instance, as described in more detail below.

Figure 2:
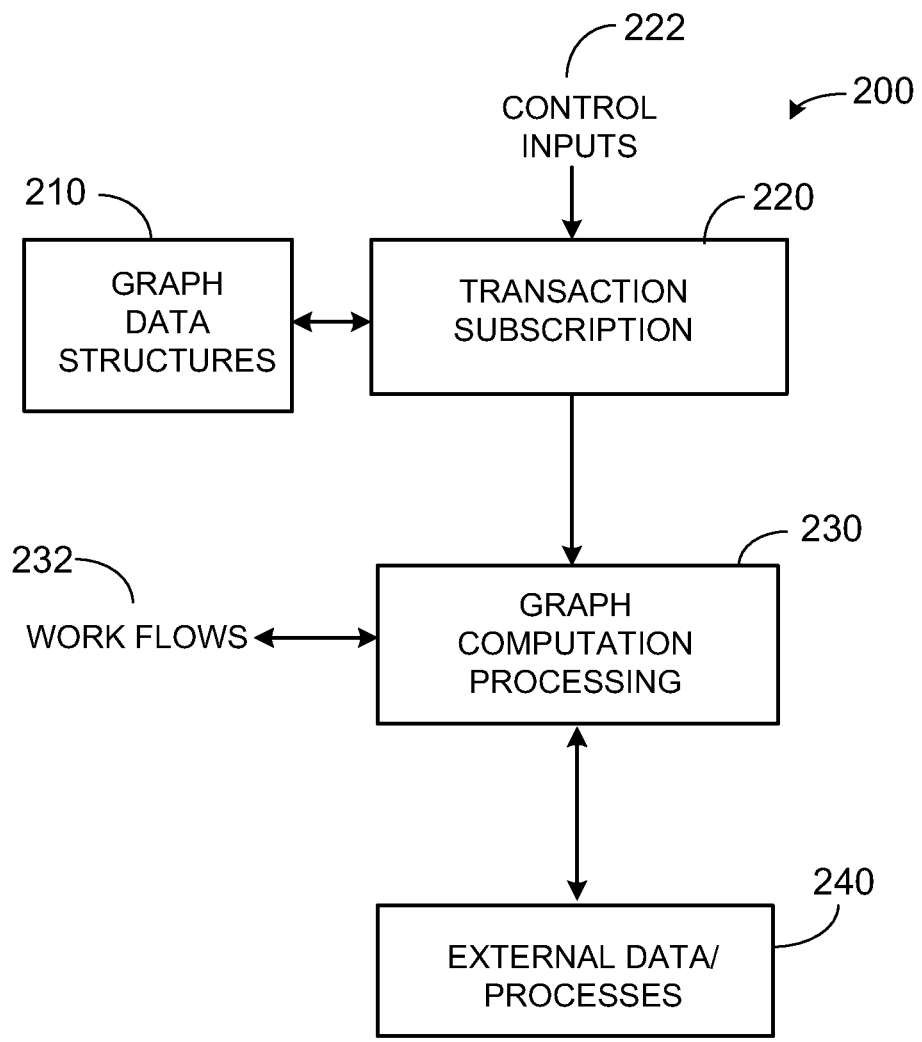
FIG. 2 is a logical block diagram of a system for processing work flows.

Referring to FIG. 2, a system 200 for executing computation graphs to process work flows comprising transactions includes stored graph data structures 210. These data structures include specifications of computation graphs that include characteristics of the vertices and links of the graphs. Portions of these data structures may be accessed without loading an entire graph, for example, the specification of an individual graph component may be loaded in order to assign a work element to a newly-created instance of that graph component.

A transaction subscription module 220 of the system receives control inputs 222 from a transaction subscribing graph component (e.g., a component providing commands without necessarily processing work elements, such as the component represented by vertex 10 FIG. 1) including commands to process particular work flows 232 using corresponding computation graphs, which are specified in the stored graph data structures 210. The transaction subscription module 220 keeps track of graph computation processing resources 230 available for instantiating graph instances that are to be assigned to particular transactions. The transaction subscription module 220 includes a scheduler that uses the specifications of the computation graphs to determine how to instantiate graph instances using the graph computation processing resources 230, which is generally made up of multiple processes (or pools of processes), where each process functions as a reusable computation element that instantiates a given graph component in a graph instance. The processes that are executed to perform the computations of the components of a graph can make use of external data and processes 240, which include database engines, data storage, or other modules that are accessed during processing associated with vertices of the computation graphs. In some examples, a single process or set of processes capable of performing multiple different operations is bound to a given instance of a graph to handle all the operations of that instance.

In some examples, the scheduler of the transaction subscription module 220 uses a remote procedure call (RPC) process. When the scheduler receives a work element for a given transaction, it assigns the work element to the appropriate component of a graph instance associated with (i.e., assigned to) the transaction. The process assigned to that graph instance executes the computation of that component. The data associated with the work element is written to a temporary space available for the graph instance and accessible by the process. The scheduler is notified that the transaction subscription module 220 is done with that component, and the scheduler then schedules any downstream graph components for execution. Eventually the transaction will progress through the whole graph (as the graph is executed using the graph computation processing resources 230), and be output by way of an RPC publish process. This takes the data accumulated in the temporary space and commits it to the appropriate output channel, e.g., the database output 6 in FIG. 1. The RPC publish process can be multiplexed with the RPC subscribe process so that it can access the socket on which the transaction was initially received.

In general, different transactions may be processed concurrently, each being processed by a different instance of a graph. System 200, through the transaction subscription module 220, allocates resources for an instance of a computation graph for each transaction and, through the graph computation processing resources 230, controls their execution to process the work flows.

2. Graph Data Structures

System 200 includes a number of features that provide rapid startup of graph computations as well as efficient sharing of limited resources.

Before processing a transaction with an instance of a computation graph, the transaction subscription module 220 creates a runtime data structure for that graph instance in a functionally shared memory. In one embodiment, a single shared memory segment is created in which all the runtime data structures for graph instances are created.

The process or processes bound to a transaction are associated with the vertices of the graph and each of these processes maps the shared memory segment into its address space. The processes may be associated with vertices when graph instances are created for individual transactions or they may not be associated with vertices until instances of individual graph components are created or executed. The processes read and write work elements from and to the runtime data structures for the graph instances during processing of the transaction. That is, data for the transactions that flow through the graph are passed from component to component, and from process to process if more than one process is bound to the transaction, through these runtime data structures in the shared memory segment. By containing the data for a given transaction in a memory space accessible to each component of the graph and executing each component with a consistent process or set of processes, state can be shared between the components. Among other advantages, this allows all the database operations associated with executing the computations for a transaction to be committed at once, after it is confirmed that the transaction executed successfully.

3. Process Pools

As introduced above, graph computation processing resources 230 for executing the components of a graph instance can be implemented using process pools managed and allocated by the scheduler. For each of a number of different types of computation, a pool of processes is created prior to beginning processing of work flows of transactions using graph components requiring that type of computation. When a transaction is assigned to a graph instance, if computation of a particular type will be needed to perform the computation for a given component of the graph instance, the scheduler allocates a member of the process pool for use by the graph instance and with the given component. The member of the process pool remains associated with that graph instance for the duration of processing of the transaction, and may be re-used for other components within that graph instance that require the same type of computation. The process may be released back to the pool once no work elements remain upstream of the last component in the graph instance for that transaction that needs that type of computation. There may be many different pools of processes, each associated with a corresponding type of computation. Processes in a pool may be used for components in the same or different graph instances, including for a given type of component in different graph instances, and for multiple different components in one graph instance, for example.

In some implementations, each process in a process pool is a separate process (e.g., a UNIX process) that is invoked by the transaction subscription module 220, which manages the process pools. The module 220 maintains a separate work queue for each process pool. Each entry in a work queue identifies a specific vertex of a graph instance for which the process is to perform computation.

Some processes reserve or consume fixed resources. An example of such a process is one that makes a connection to a database, such as an Oracle® database. Since resources are consumed with forming and maintaining each database connection, it is desirable to limit the number of such processes that are active. If a graph includes multiple components that access a database, it may be desirable for all the database operations for a given transaction to take place in a single database process. To accommodate this, a set of processes may be established that each maintain a connection to the database and are each capable of performing the database functions that a given graph instance may require. When a graph instance is assigned to a given transaction, one process from the set is assigned to that graph instance for the entire transaction, as described above, and all of the database components are multiplexed to that process. When a vertex requires a process for accessing the database to process a work element of the transaction, the assigned process (which has already established its connection with the database) is associated with that vertex. In this way, the overhead of the initialization steps of that process that would have been required to connect to that database is avoided, and all database actions for a given transaction are handled by the same process. Other types of processes can be handled in the same way.

System 200 supports different approaches to configuring processes for vertices, which differ in when the vertices are associated with processes and when the computation for the vertices is initiated. In one type of configuration, a process is not associated with a vertex until all the data at all its input work elements are completely available. If a work element is large, it may take some time for the entire work element to be computed by the upstream vertex and to be available. This type of configuration avoids blocking the process waiting for input to become available, so that it can be used by other vertices in that graph instance.

Another type of configuration uses a streaming mode. A process is associated with a vertex and initiated when at least the start of each input is available. The remainder of each of its inputs becomes available while the process executes. If that input becomes available sufficiently quickly, the process does not block waiting for input. However, if the inputs do not become available, the process may block.

4. Computation Control

Figure 3A:
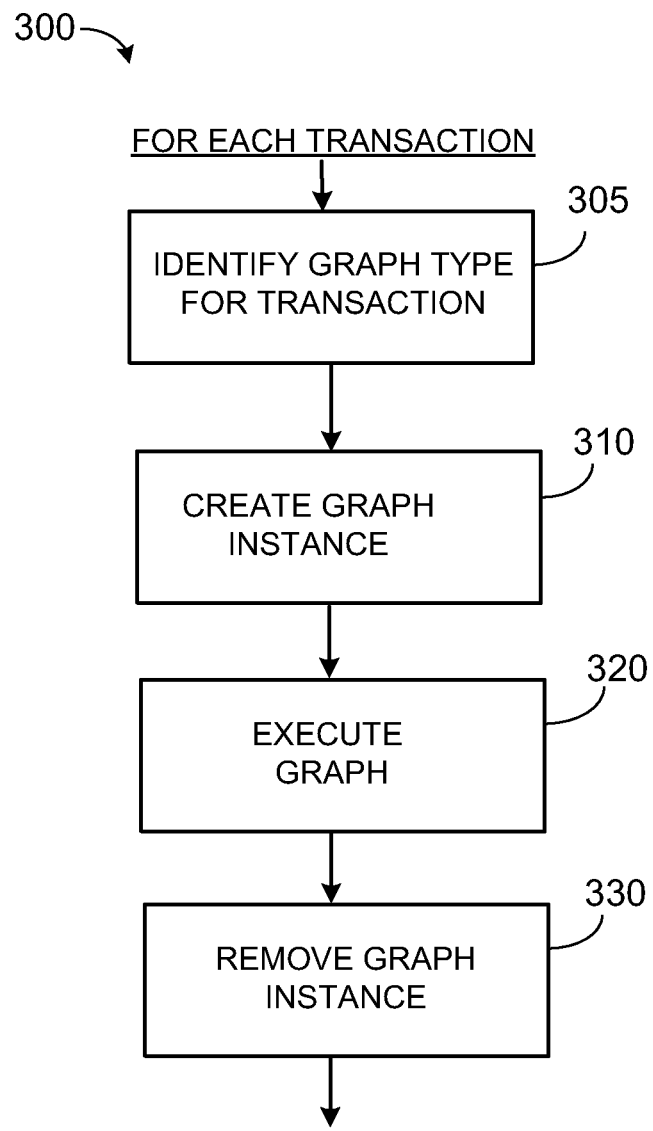
FIG. 3A is a flowchart for processing each work flow.

FIG. 3A is a flowchart for a process 300 for processing each transaction using respective graph instances. When the transaction subscription module 220 (FIG. 2) receives a request to process a transaction, it first determines which computation graph (and corresponding type) is appropriate to process the transaction (step 305). For example, the scheduler determines that a certain computation graph is appropriate (e.g., includes appropriate components) to perform a computation for the transaction. The transaction itself may specify this, or the transaction subscription module 220 may include or have access to data that associates particular transaction types with particular computation graphs. The transaction subscription module 220 then creates a graph instance (if necessary) of a computation graph of the type needed to process that transaction (step 310) and associates the transaction with it. As part of this process, the transaction subscription module 220 allocates a portion of the shared memory segment for the runtime data structure for the graph instance, and copies a graph template for that type of computation graph into runtime data structure, thereby initializing the runtime data structure. Examples of the use of graph templates are described in more detail in U.S. Pat. No. 7,167,850, incorporated herein by reference. In some examples, graph instances have already been created and at this stage one is merely assigned to the present transaction. The transaction subscription module 220 then executes the graph instance (step 320), under control of the scheduler, as described in more detail below. The graph instance includes computation elements (e.g., processes) associated with (assigned to) respective components that are reusable. When the transaction's entire work flow has been processed, the transaction subscription module 220 commits results of the execution of the graph (e.g., commits changes to an output database) and optionally releases the assigned resources and computation elements and deletes the runtime data structure for the graph instance, thus permitting that portion of the shared memory segment to be reused for other graph instances (step 330).

5. Alternatives

As noted above, it is possible to pre-create graph pools of already instantiated instances of computation graphs in anticipation of there being transactions that will require them. When a transaction is received and needs a graph instance, if one is available from a graph pool, it is assigned from the pool rather than having to be created. In this way, the startup cost for a transaction is further reduced. When the computation for the transaction is completed, the graph is reset by restoring variables to their initial values prior to having been assigned to the transaction and freeing any dynamically-assigned memory. After the graph instance is reset it is returned to the pool.

In some examples, the number of graph instances in a graph pool can be allowed to grow as needed. For instance, there might be a minimum number of instances of each graph, and more may be created as needed.

In the description above, processes may be assigned to vertices in the graph in an on-demand manner where they are not associated with a vertex until after all the inputs to that vertex are available, though they are bound to the particular graph instance and transaction. Another approach is to associate the processes to the vertices when the transaction is associated with the graph instance and to maintain the association until the transaction's entire work flow has been processed.

6. Applications

One application of computation graphs of the type described above is for processing financial transactions in a banking application. In general, different types of transactions require different types of computation graphs. A typical computation graph is associated with some combination of a type of customer transaction and "backend" services that are needed to process the transaction. For example, transactions can be ATM requests, bank teller inputs, and business-to-business transactions between computers or web servers. Different customers might have different backend systems, particularly when banks consolidate and customers are combined from different original banks. Their accounts may be maintained on very different backend systems even though they are all customers of the acquiring bank. Therefore, different vertices in a graph may be used to process different transactions. Different services may be associated with vertices in the graph. For example, some of the vertices may be associated with functions such as updating a balance, depositing money in an account, or performing an account hold so funds are held in an account. In some implementations, on-the-fly assignment of processes to vertices avoids the overhead of having processes for unused vertices remain idle.

An advantage of allocating graph instances on a per-transaction basis is that it allows parallelization of data streams that otherwise would have to be processed serially. Graph instances assigned to different transactions may finish in a different order than they started, for example, if the first transaction was more complicated than the second. This may allow the second graph instance to be released and available to process a third transaction when a serialized system would still be processing the first transaction.

7. Error Handling

An advantage of allocating graph instances on a per-transaction basis is that failures due to errors in executing a graph instance can be contained to that transaction, and do not compromise the concurrent processing of other graph instances. By delaying committing the results of the computation graph until the entire transaction is completed, the data can be "rolled-back", in the event of an error, to the state that it was in before the system began to process the transaction. Errors can be handled in several ways.

In some examples, an "error handling" component is included in a graph. The error handling component is a special case in that it does not have to execute for the graph to complete. In the event that the component at any vertex generates an error, instead of causing the whole computation to abort, execution of the graph is redirected to the error handling component. An explicit relationship between a given component and an error handling component (including a work flow from an output port of a component to an input port of the error handling component) is referred to as an exception flow. The scheduler removes work elements that were part of the failed computation from the graph instance and the error handling component provides an output which the graph can use to provide an error message as output to the process that called it. The error handling component may receive data input other than through an exception flow, depending on the implementation.

Figure 3B:
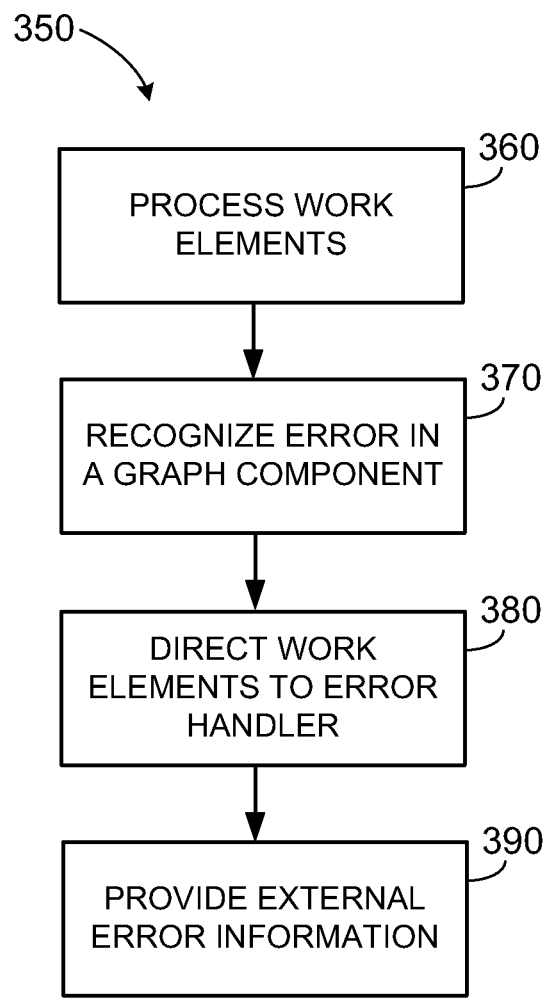
FIG. 3B is a flowchart for handling errors.

FIG. 3B shows a flowchart for an exemplary procedure 350 for executing a graph and handling an error that occurs in the graph. The scheduler processes a work flow of work elements (step 360) in the graph components according to the links. When the scheduler recognizes (step 370) that an error has occurred in a graph component, the scheduler redirects processing to the error-handling component. One aspect of this redirection is directing (step 380) work elements to the error-handling component according to any exception flows to that error-handling component. As described in more detail below, processing of the exception flow enables the error-handling component to provide (step 390) error information to a process external to the graph that represents the state of the graph processing before the graph began processing the transaction in which the error occurred.

Figure 4A:
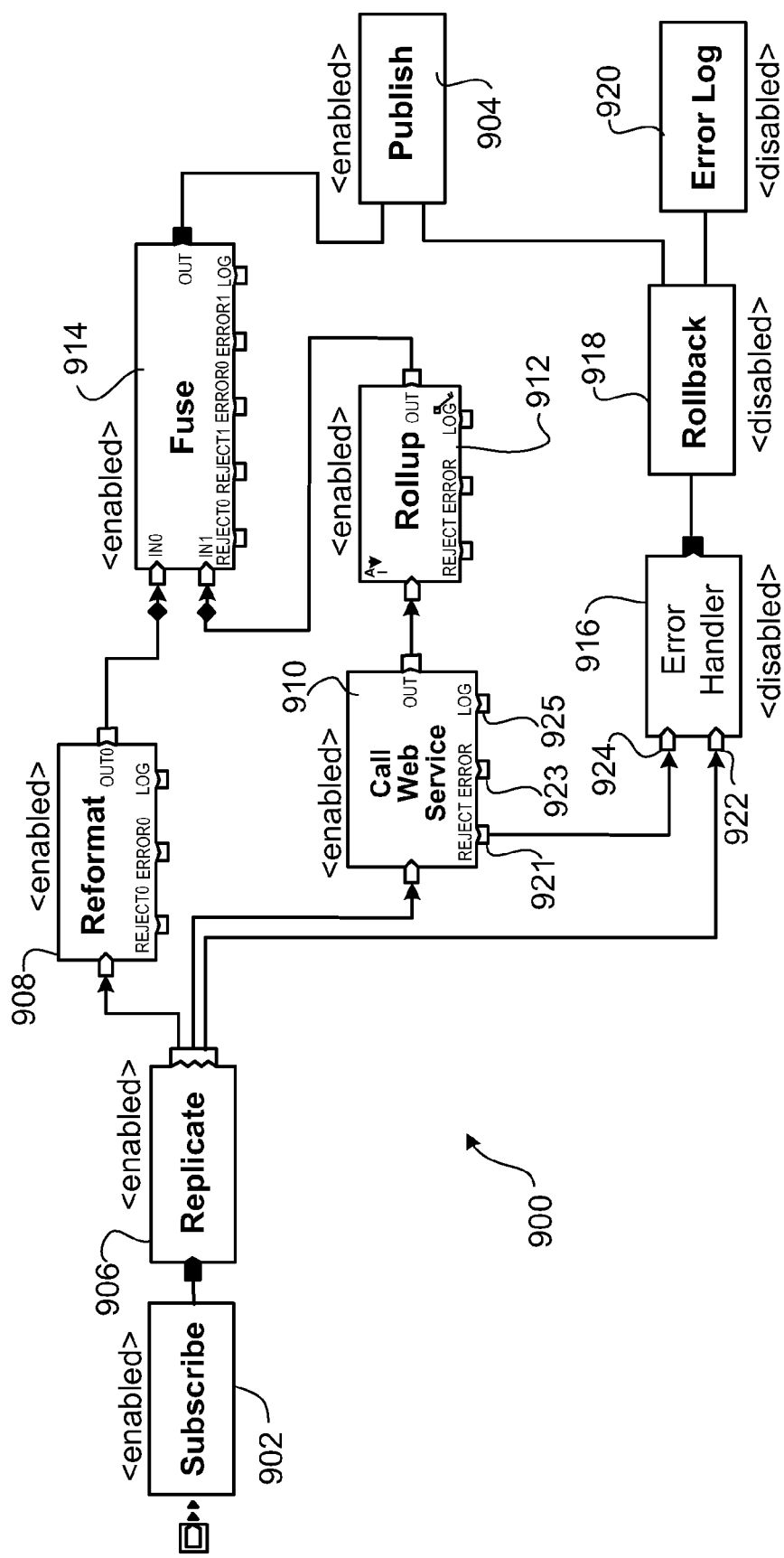
FIGS. 4A, 4B, 5, and 6 are examples of error-handling graphs.
Figure 4B:
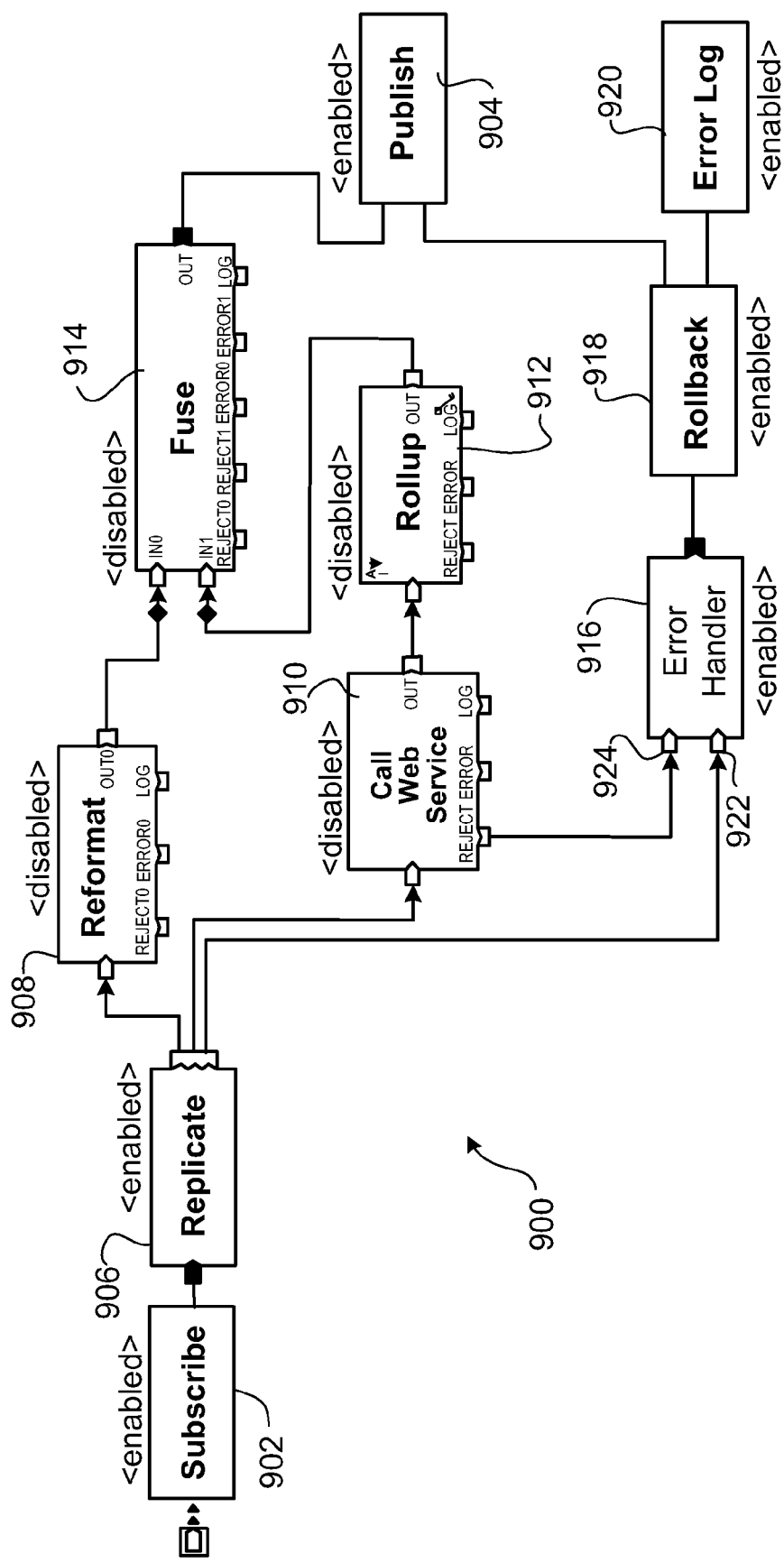

For any component in a graph, there is a designated error handling component. This may be a component that directly receives an exception flow output or other error data output from another graph component, or it may be defined as the designated error handling component for a set of components regardless of whether it receives an exception flow. In some examples, exception flow is handled as shown in FIGS. 4A-B. In this example, the graph is designed for carrying out a transactional computation and subscribe 902 and publish 904 components are shown, but the same technique can be used in graphs for non-transactional work flows. In FIG. 4A, the scheduler has activated a graph 900. Beginning with the first component, subscribe 902, each component in any non-exception path downstream is marked as "enabled." An exception path is a path that only receives a flow of work elements or other error data in the case of an exception (e.g., an exception flow leading to an error handling component as described above). This is referred to as enablement propagation. A given component that is downstream of others is enabled if any of its inputs is connected to an upstream component that is enabled. That is, replicate 906, reformat 908, call web service 910, rollup 912, fuse 914, and publish 904 are all enabled, but the error handler 916 and the two components rollback 918 and error log 920 downstream of it, which do not receive non-exception input flows from any enabled components, remain "disabled."

If an error occurs, the scheduler halts execution of the erring component, allows any other components that are already executing to finish, and propagates any relevant data (e.g., exception flow output of the completed components, or "error reporting output" of the erring component) to the error handling component. For example, if the call web service component 910 triggers an error, the exception flow from replicate component 906 and error reporting output from a reject port 921 of the call web service component 910 are input to the error handling component 916 at inputs 922, 924, respectively. Error reporting output ports (shown as ports on the bottom of some of the components in the graph 900) can be used to provide information about any errors that have occurred including, for example, information characterizing what error(s) occurred, where the error(s) occurred, and any rejected work elements associated with the error(s).

In this example, there are three error reporting output ports for the replicate component 906. The reject port 921 provides work elements that may have caused the error or are in some way related to the error. The error port 923 provides an error messages describing relevant information about the error. The log port 925 can optionally provide information logging that the error occurred. The log port 925 can also provide log information about events during the normal course of execution even if no errors occur. In this example, the reject port 921 is explicitly shown as connected for those components (e.g., the call web service component 910) that may need to use the port. However, the error port 923 and log port 925 are not explicitly shown as connected, but have implicit connections to the error handling component 916. For example, the ports can be connected by a developer and then hidden using an interface control. In some implementations, the system can automatically determine implicit connections to a default error handling component, which may then be overridden by the developer. For large and/or complicated graphs, this "implicit wiring" for one or more types of error reporting ports improves visual comprehension of a graph by a developer, which is one of the benefits of graph-based programming. In some implementations, visual cues can be provided to indicate that a port is implicitly connected to a port of another component (e.g., an icon or a shaded or colored port). Some or all of the hidden implicit work flow connections can also be revealed as explicit links in response to a user request (e.g., clicking a button or hovering over a port).

The exception flow output from the replicate component 906 may have already been queued at the input 922, if the replicate had finished operation before the error occurred. The scheduler then enables the error handling component (916 in this example), disables the erring component (910 in this example), and performs enablement propagation from the error handling component (enabling 918, 904, 920 in this example). Any component downstream of the disabled erring component is also disabled as long as that component does not receive a flow from an enabled component downstream of the error handling component (disabling 912 and 914 in this example). Finally, any remaining component that provides a flow to an enabled component is enabled (enabling 906 and 902 in this example).

Thus, the result of this procedure is shown by the indication of "<enabled>" and "<disabled>" components in FIG. 4B. Connecting the publish component 904 back into the flow after the error handler 916 allows the transaction to be completed, albeit with an error message for its output. Data that had already propagated to the now-disabled components, e.g., output from the reformat component 908, is discarded.

As noted above, data may flow to the error handling component as part of an exception flow or as part of an error reporting output of another component. Data that is available before the error occurs, for example, output data from the replicate module 906 in FIG. 4B, is held in escrow in an input queue for the error handler 916 until it is needed, if it ever is. If the graph completes without error, the error handler 916 is never activated and the data is discarded. If an error does occur, the error handler 916 uses whatever input data it has received to formulate a response. In some examples, as in FIG. 4B, a rollback component 918 is used. The input data from the replicate component 906 tells the error hander 916 what the state of things was before the graph began processing the transaction. The error hander 916 outputs this to the rollback component 918 which uses it to restore any data that was modified by the other components to its state prior to the execution of the transaction. Execution flow then goes to both the error log 920 which logs the error, and to the publish component 904 so that the error can be reported and appropriately handled by whatever higher-level process delivered it to the graph 900. An exception flow from any component to the error handler 916 may also include data. If there is input to the error hander 916 other than the original data from the replicate component 906, such as error output from the call web service component 910 or an exception flow from any other component (not shown), this may be used to formulate a more-detailed error message at either the error log or the publish component.

Figure 5:
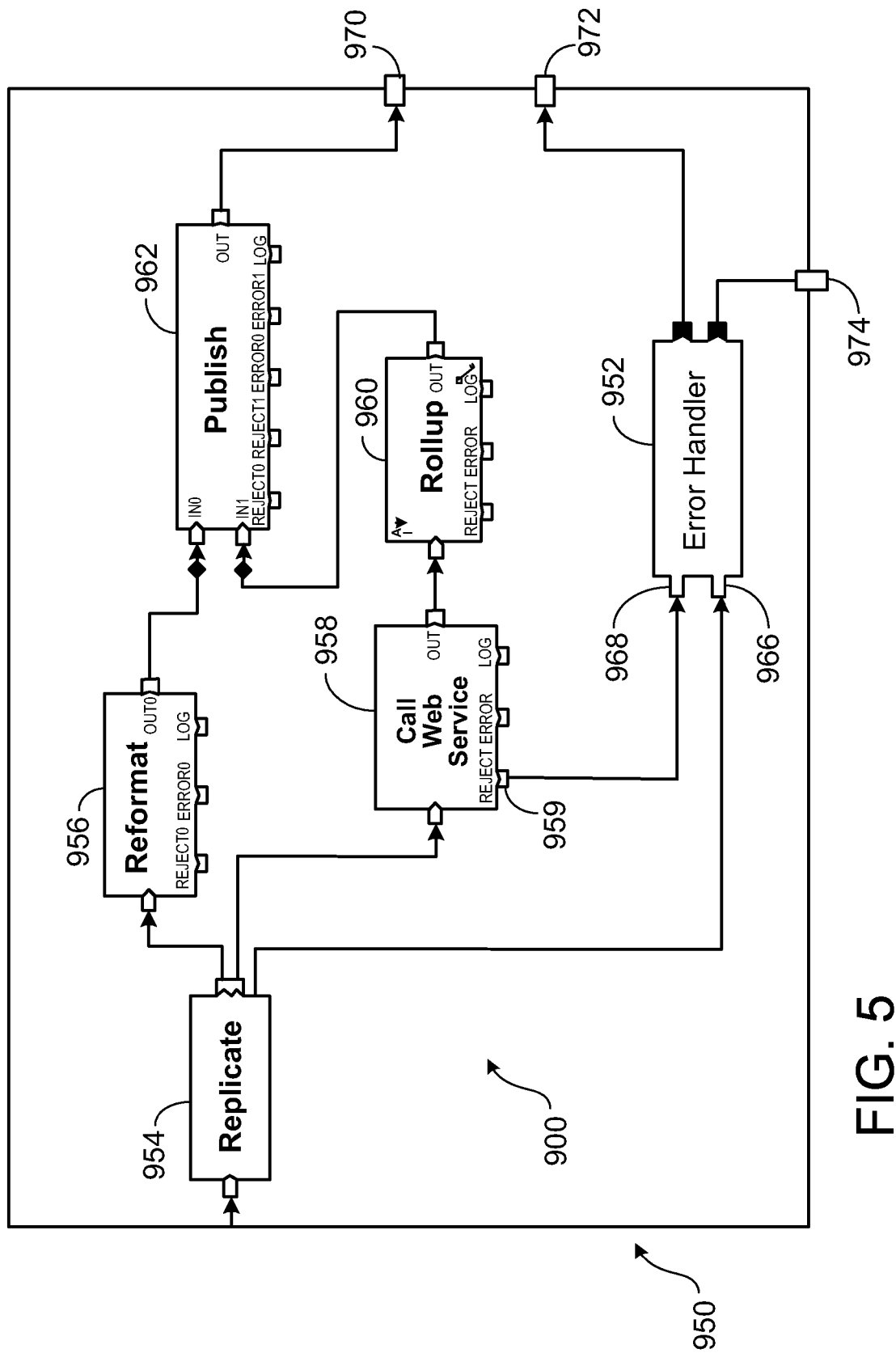

In some examples, as shown in FIG. 5, a graph includes vertices that are implemented as sub-graphs, e.g. sub-graph 950, each of which may have its own error handling component 952. Thus, there can be a hierarchy of sub-graphs with a top level graph, having vertices that are sub-graphs at a lower "graph level," and so on. If an error occurs in any component 954, 956, 958, 960, 962 of the sub-graph 950, the processing flow is routed to the error handling component 952 which provides error reporting output on a sub-graph error reporting port 974. The scope of the error handling component 952 is the sub-graph 950. The error handling component may have inputs 966, 968 that receive output from either an exception flow from another graph element (e.g., element 954) or error output 959 of another graph element (e.g., element 958) which may themselves be nested sub-graphs. In some examples, if an error handling component has multiple inputs, only the input that most recently received data is used. If all the components of the sub-graph 950 complete their operations successfully, output (a work flow) is delivered to the normal sub-graph output port 970 and processing flow beyond the sub-graph 950 continues normally. If an error occurs, it can be handled and reported on an error flow output 972, or an error reporting output 974. In other examples, errors can also be reported on the standard output 970.

If a sub-graph does not have error handling, its errors flow upwards in the hierarchy of sub-graphs of which it is a part until they reach a graph level that does have error handling, at which point that level's error-handling component is activated.

The data escrowed at the input of the error handling component may be a subset of a work flow, it may be all the data associated with a transaction, or it could be an entire data flow. If the error-handling component has an error output port, it will output the record that caused the error or other error information based on the escrowed data or the input received from the component that had the error. If it does not have such a port, it may simply output the offending record as normal output on its output port.

If a sub-graph does not have error handling, errors in its components flow upwards in the hierarchy of sub-graphs of which it is a part until they reach a graph level that does have error handling, at which point that level's error-handling component receives appropriate input and generates an appropriate error output.

Figure 6:
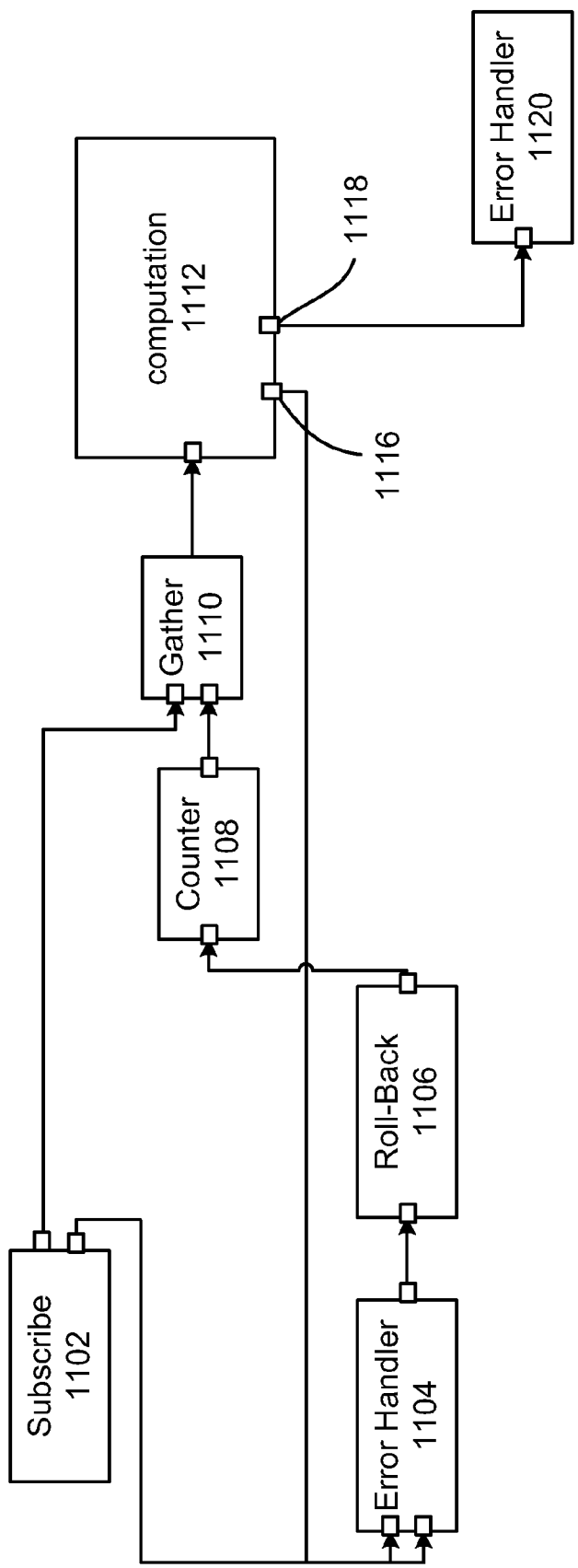

Error handling can allow cyclic graph arrangements that would ordinarily be avoided in graph-based computation processing. For example, as shown in FIG. 6, in a graph 1100 an error output 1116 from a computation component 1112 downstream from an error hander 1104 returns flow back to that same error handler 1104. The error handler 1104 also receives input from a subscribe component 1102 and provides output to a roll-back component 1106 as in FIG. 4A. The roll-back 1106 returns the data to the state it was in before the failed computation was attempted, based on the data input to the error hander 1104 by the subscribe component 1102. A counter component 1108 may receive the flow from the roll-back component 1106 and increment its value before returning flow to the gather component 1110. The computation component 1112 can use the value input from the counter component 1108 in several different ways. It can consult the value before carrying out its computation, for example, to see if it should change something about its operation. It can also consult the counter after an error, to see if some threshold number of attempts has been made. If the threshold has been exceeded, instead of returning the error output to the error handler 1104 through the output 1116 again, it directs its output to a second error output 1118 that leads to a second error handler 1120. If a counter component is not used, some other technique can be used to break the cycle and assure that the graph eventually completes.

To assure that a cyclic graph is well-defined, the set of elements that will be enabled on error is determined in advance based on the topology of the graph, rather than being done as-needed as described above.

In some examples, other rules are used to assure that error handling works correctly. For example, in some implementations, error handling can only be triggered on one exception port of one component within a graph (any simultaneous errors may be ignored). If a graph component or sub-graph is linked to an error handling component, it must use that component on any error. If a graph component or sub-graph is not linked to an error handling component, errors must be handled by the generic error handler for the present scope. Each graph component is typically associated with exactly one error handler. These rules may be modified or combined depending on the requirements of the system. They can be useful where tight control of the process for each transaction is needed.

In some examples, when an error occurs, the operating system determines which error-handling component is associated with the component that experienced the error, and then determines which input flow, if any, to that error-handling component should be used. If there are multiple inputs, the one that most recently had data written to it is used.

Error handling may be active, as just described, where components or sub-graphs handle their own errors and produce error codes that can be used by other components to diagnose or work around the error, or it can be passive. In a passive system, a graph that encounters an error simply fails, and allows the operating system to provide error handling, for example by providing a stack dump to a debugging process.

Each component of a graph is implicitly connected to a scheduler, which doesn't need a specific invitation from a graph to intervene and handle errors. The scheduler can remove data related to an error from a graph instance and, in some examples, does not need to know the nature of the error. In some cases, the scheduler may return resources assigned to a graph to their respective pools in stages, allowing the graph to complete processing work elements that were not affected by the error.

8. Implementation

The invention may be implemented in hardware or software, or a combination of both (e.g., programmable logic arrays). Unless otherwise specified, the algorithms described are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmed or programmable computer systems (which may be of various architectures such as distributed, client/server, or grid) each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. Other embodiments are within the scope of the following claims.

What is claimed is:

1. A method for processing transactions using graph-based computations, the method including:
   selecting a computation graph from a plurality of computation graphs, including determining which computation graph among the plurality of computation graphs includes one or more graph elements that are associated with a computation to be performed for a given transaction,
   associating the given transaction with an instance of the selected computation graph, in which the selected computation graph includes computation elements configured to instantiate respective graph elements in the instance of the selected computation graph, and
   executing the instance of the selected computation graph to perform the computation.

2. The method of claim 1 wherein at least some instances of the graphs in the plurality of computation graphs share one or more of the computation elements.

3. The method of claim 1 wherein the computation elements include computations executed by at least one of an operating system process and a process thread.

4. The method of claim 1 wherein the graph elements include vertices of the computation graphs.

5. The method of claim 1 wherein associating the transaction with an instance of the computation graph includes assigning a computation element corresponding to each graph element in the computation graph to the instance of the computation graph before beginning executing the graph elements.

6. The method of claim 1 wherein associating the transaction with an instance of the computation graph includes assigning a computation element corresponding to a graph element in the computation graph to the instance of the computation graph after executing another graph element using a computation element already assigned to the instance.

7. The method of claim 1 in which at least two of the graph elements use a common resource, and executing the graph to perform the computation includes assigning each of the graph elements using the common resource to a single computation element.

8. The method of claim 7 in which the single computation element is already initiated when the graph elements are assigned to the computation element.

9. The method of claim 7 in which the common resource includes at least one of a database and a specific port.

10. The method of claim 1 also including
    determining that at least one of the graph elements of the selected computation graph is associated with a computation to be performed for a second transaction, associating the second transaction with a second instance of the selected computation graph, and executing the second instance of the selected computation graph to perform the computation for the second transaction.

11. The method of claim 10 wherein the computations for transactions performed using different instances of computation graphs are performed in a time-interleaved manner.

12. The method of claim 10 wherein multiple transactions are processed concurrently.

13. The method of claim 10 wherein each transaction is associated with one or more work elements that are processed according to the corresponding computation graph.

14. The method of claim 13 wherein at least some transactions are each associated with one work element that is processed according to the corresponding computation graph.

15. The method of claim 1 further including forming multiple instances of at least some of the computation graphs.

16. The method of claim 1 further including identifying that an error has occurred in the performing of a computation for one of the transactions, and continuing the performing of a computation for another one of the transactions.

17. The method of claim 1 wherein the processing of a first transaction of the plurality of transactions starts at a first time, and the processing of a second transaction of the plurality of transactions starts at a second time later than the first time, the method further including completing the performing of the computation for the second transaction before completing the performing of the computation for the first transaction.

18. The method of claim 1 including committing the performed computation to a database after multiple computations for the given transaction are performed.

19. A system for processing transactions using graph-based computations, the system including:

means for selecting a computation graph from a plurality of computation graphs, including means for determining which computation graph among the plurality of computation graphs includes one or more graph elements that are associated with a computation to be performed for a transaction, means for associating the given transaction with an instance of the selected computation graph, in which the selected computation graph includes computation elements configured to instantiate respective graph elements in the instance of the selected computation graph, and means for executing the instance of the selected computation graph to perform the computation.

20. A method for processing graph-based computations including:

within a computation graph including vertices representing work element-handling graph components that process work elements according to links joining the vertices, providing at least one error-handling graph component within the computation graph, the at least one error-handling graph component distinct from the work element-handling graph components and configured to provide error information to a process external to the computation graph, processing data, including, in response to a work element-handling graph component encountering an error while processing, redirecting processing to the error-handling graph component, and directing at least some of the work elements to the error-handling graph component according to at least one link to a vertex representing the error-handling graph component.

21. The method of claim 20 in which redirecting processing to the error-handling graph component includes removing work elements from at least one input queue.

22. The method of claim 20 in which redirecting processing to the error-handling graph component includes processing the work elements directed to the error-handling graph component.

23. The method of claim 22 in which processing the work elements directed to the error-handling graph component includes rolling back changes to a database made prior to the error.

24. The method of claim 23 in which if output provided by the sub-graph indicates that an error occurred in the sub graph, redirecting processing to the error-handling graph component.

25. The method of claim 22 in which processing the data includes, for graph components not included in handling the error, discarding work elements directed to those graph components.

26. The method of claim 20 also including providing a sub-graph, the sub-graph including an error-handling sub-graph component configured to provide an error code as an output of the sub-graph.

27. The method of claim 20 in which redirecting processing to the error-handling graph component includes communicating, from the graph component that encountered the error, to the error-handling graph component, work elements that the graph component was processing when the error occurred.

28. The method of claim 27 in which the work elements are communicated according to the link to the vertex representing the error-handling component.

29. The method of claim 27 in which redirecting processing to the error-handling graph component includes communicating, from the graph component that encountered the error, to the error-handling graph component, reporting information about the error.

30. The method of claim 29 in which the reporting information is communicated according to an implicit connection between the graph component that encountered the error and the error-handling component.

31. The method of claim 30 also including revealing the implicit connection as an explicit link between a vertex representing the graph component that encountered the error and a vertex representing the error-handling component in response to a user request.

32. The method of claim 20 in which providing the error-handling graph component includes providing a plurality of error-handling graph components, and redirecting processing to the error-handling graph component includes selecting an error-handling graph component based on output provided from the graph component that encountered the error.

33. The method of claim 20 in which processing the data also includes, if a graph component encounters an error while processing, outputting an identification of a work element that caused the error.

34. The method of claim 20 in which processing includes:
enabling a first component of the computation graph;
disabling the error-handling component; and
for each component downstream of the first component other than the error-handling component, enabling the component if a component immediately upstream of the component is enabled.

35. The method of claim 34 in which redirecting processing to the error-handling graph component includes:
stopping execution of each enabled graph component, disabling the component that encountered the error;

enabling the error-handling component;
disabling components downstream of the component that encountered the error that are not downstream of the error-handling component; and
enabling components upstream of the error-handling component.

36. The method of claim 20 in which redirecting processing to the error-handling graph component includes, where the error occurred in a first component,
if the error occurs under a first condition, directing process flow from the first component to a first error-handling component upstream of the first component,
and if the error occurs under a second condition, directing process flow from the first component to a second error-handling component downstream of the first component.

37. The method of claim 36 in which the first condition is that a counter is below a limit.

38. The method of claim 36 in which the second condition is that a counter is above a limit.

39. The method of claim 36 in which redirecting processing to the error-handling graph component also includes enabling a set of graph components, the set having been determined prior to the error.

40. A system for processing graph-based computations, the system including:
within a computation graph including vertices representing work element-handling graph components that process work elements according to links joining the vertices,
means for providing at least one error-handling graph component within the computation graph, the at least one error-handling graph component distinct from the work element-handling graph components and configured to provide error information to a process external to the graph,
means for processing data, including, in response to a work element-handling graph component encountering an error while processing, redirecting processing to the error-handling graph component, and
means for directing at least some of the work elements to the error-handling graph component according to at least one link to a vertex representing the error-handling graph component.

41. A computing system for processing transactions using graph-based computations, the system including:
at least one processor configured to:
select a computation graph from a plurality of computation graphs, including determining which computation graph among the plurality of computation graphs includes one or more graph elements that are associated with a computation to be performed for a given transaction,
associate the given transaction with an instance of the selected computation graph, in which the selected computation graph includes computation elements configured to instantiate respective graph elements in the instance of the selected computation graph, and
execute the instance of the selected computation graph to perform the computation.

42. The computing system of claim 41 wherein at least some instances of the graphs in the plurality of computation graphs share one or more of the computation elements.

43. The computing system of claim 41 wherein the computation elements include computations executed by at least one of an operating system process and a process thread.

44. The computing system of claim 41 wherein the graph elements include vertices of the computation graphs.

45. The computing system of claim 41 wherein associating the transaction with an instance of the computation graph includes assigning a computation element corresponding to each graph element in the computation graph to the instance of the computation graph before beginning executing the graph elements.

46. The computing system of claim 41 wherein associating the transaction with an instance of the computation graph includes assigning a computation element corresponding to a graph element in the computation graph to the instance of the computation graph after executing another graph element using a computation element already assigned to the instance.

47. The computing system of claim 41 in which at least two of the graph elements use a common resource, and executing the graph to perform the computation includes assigning each of the graph elements using the common resource to a single computation element.

48. The computing system of claim 47 in which the single computation element is already initiated when the graph elements are assigned to the computation element.

49. The computing system of claim 47 in which the common resource includes at least one of a database and a specific port.

50. The computing system of claim 41 wherein the processor is configured to:
determine that at least one of the plurality of graph elements of the selected computation graph includes a computation to be performed for a second transaction,
associate the second transaction with a second instance of the computation graph, and
execute the second instance of the selected computation graph to perform the computation for the second transaction.

51. The computing system of claim 50 wherein the computations for transactions performed using different instances of computation graphs are performed in a time-interleaved manner.

52. The computing system of claim 50 wherein multiple transactions are processed concurrently.

53. The computing system of claim 50 wherein each transaction is associated with one or more work elements that are processed according to the corresponding computation graph.

54. The computing system of claim 53 wherein at least some transactions are each associated with one work element that is processed according to the corresponding computation graph.

55. The computing system of claim 41 wherein the processor is configured to form multiple instances of at least some of the computation graphs.

56. The computing system of claim 41 wherein the processor is configured to identify that an error has occurred in the performing of a computation for one of the transactions, and continue the performing of a computation for another one of the transactions.

57. The computing system of claim 41 wherein the processing of a first transaction of the plurality of transactions starts at a first time, and the processing of a second transaction of the plurality of transactions starts at a second time later than the first time, and wherein the processor is configured to complete the performing of the computation for the second transaction before completing the performing of the computation for the first transaction.

58. A computing system for processing graph-based computations including:
  at least one processor configured to:
    within a computation graph including vertices representing work element-handling graph components that process work elements according to links joining the vertices,
    provide at least one error-handling graph component within the computation graph, the at least one error-handling graph component distinct from the work element-handling graph components and configured to provide error information to a process external to the computation graph,
    process data, including, in response to a work element-handling graph component encountering an error while processing, redirecting processing to the error-handling graph component, and
    direct at least some of the work elements to the error-handling graph component according to at least one link to a vertex representing the error-handling graph component.

59. The computing system of claim 58 in which redirecting processing to the error-handling graph component includes removing work elements from at least one input queue.

60. The computing system of claim 58 in which redirecting processing to the error-handling graph component includes processing the work elements directed to the error-handling graph component.

61. The computing system of claim 60 in which processing the work elements directed to the error-handling graph component includes rolling back changes to a database made prior to the error.

62. The computing system of claim 61 in which if output provided by the sub-graph indicates that an error occurred in the sub graph, redirecting processing to the error-handling graph component.

63. The computing system of claim 60 in which processing the data includes, for graph components not included in handling the error, discarding work elements directed to those graph components.

64. The computing system of claim 58 wherein the processor is configured to provide a sub-graph, the sub-graph including an error-handling sub-graph component configured to provide an error code as an output of the sub-graph.

65. The computing system of claim 58 in which redirecting processing to the error-handling graph component includes communicating, from the graph component that encountered the error, to the error-handling graph component, work elements that the graph component was processing when the error occurred.

66. The computing system of claim 65 in which the work elements are communicated according to the link to the vertex representing the error-handling component.

67. The computing system of claim 65 in which redirecting processing to the error-handling graph component includes communicating, from the graph component that encountered the error, to the error-handling graph component, reporting information about the error.

68. The computing system of claim 67 in which the reporting information is communicated according to an implicit connection between the graph component that encountered the error and the error-handling component.

69. The computing system of claim 68 wherein the processor is configured to reveal the implicit connection as an explicit link between a vertex representing the graph component that encountered the error and a vertex representing the error-handling component in response to a user request.

70. The computing system of claim 58 in which providing the error-handling graph component includes providing a plurality of error-handling graph components, and redirecting processing to the error-handling graph component includes selecting an error-handling graph component based on output provided from the graph component that encountered the error.

71. The computing system of claim 58 in which processing the data also includes, if a graph component encounters an error while processing, outputting an identification of a work element that caused the error.

72. The computing system of claim 58 in which processing includes:
  enabling a first component of the computation graph;
  disabling the error-handling component; and
  for each component downstream of the first component other than the error-handling component, enabling the component if a component immediately upstream of the component is enabled.

73. The computing system of claim 72 in which redirecting processing to the error-handling graph component includes:
  stopping execution of each enabled graph component,
  disabling the component that encountered the error;
  enabling the error-handling component;
  disabling components downstream of the component that encountered the error that are not downstream of the error-handling component; and
  enabling components upstream of the error-handling component.

74. The computing system of claim 58 in which redirecting processing to the error-handling graph component includes, where the error occurred in a first component,
  if the error occurs under a first condition, directing process flow from the first component to a first error-handling component upstream of the first component,
  and if the error occurs under a second condition, directing process flow from the first component to a second error-handling component downstream of the first component.

75. The computing system of claim 74 in which the first condition is that a counter is below a limit.

76. The computing system of claim 74 in which the second condition is that a counter is above a limit.

77. The computing system of claim 74 in which redirecting processing to the error-handling graph component also includes enabling a set of graph components, the set having been determined prior to the error.

78. A non-transitory computer-readable storage medium storing a computer program for processing transactions using graph-based computations, the computer program including instructions for causing a computer system to:
  select a computation graph from a plurality of computation graphs, including determining which computation graph among the plurality of computation graphs includes one or more graph elements that are associated with a computation to be performed for a given transaction,
  associate the given transaction with an instance of the selected computation graph, in which the selected computation graph includes computation elements configured to instantiate respective graph elements in the instance of the selected computation graph, and
  execute the instance of the selected computation graph to perform the computation.

79. The computer-readable storage medium of claim 78 wherein at least some instances of the graphs in the plurality of computation graphs share one or more of the computation elements.

80. The computer-readable storage medium of claim 78 wherein the computation elements include computations executed by at least one of an operating system process and a process thread.

81. The computer-readable storage medium of claim 78 wherein the graph elements include vertices of the computation graphs.

82. The computer-readable storage medium of claim 78 wherein associating the transaction with an instance of the computation graph includes assigning a computation element corresponding to each graph element in the computation graph to the instance of the computation graph before beginning executing the graph elements.

83. The computer-readable storage medium of claim 78 wherein associating the transaction with an instance of the computation graph includes assigning a computation element corresponding to a graph element in the computation graph to the instance of the computation graph after executing another graph element using a computation element already assigned to the instance.

84. The computer-readable storage medium of claim 78 in which at least two of the graph elements use a common resource, and executing the graph to perform the computation includes assigning each of the graph elements using the common resource to a single computation element.

85. The computer-readable storage medium of claim 84 in which the single computation element is already initiated when the graph elements are assigned to the computation element.

86. The computer-readable storage medium of claim 84 in which the common resource includes at least one of a database and a specific port.

87. The computer-readable storage medium of claim 78 wherein the computer program includes instructions for causing the computer system to:
determine that at least one of the plurality of graph elements of the selected computation graph includes a computation to be performed for a second transaction,
associate the second transaction with a second instance of the computation graph, and
execute the second instance of the selected computation graph to perform the computation for the second transaction.

88. The computer-readable storage medium of claim 87 wherein the computations for transactions performed using different instances of computation graphs are performed in a time-interleaved manner.

89. The computer-readable storage medium of claim 87 wherein multiple transactions are processed concurrently.

90. The computer-readable storage medium of claim 87 wherein each transaction is associated with one or more work elements that are processed according to the corresponding computation graph.

91. The computer-readable storage medium of claim 90 wherein at least some transactions are each associated with one work element that is processed according to the corresponding computation graph.

92. The computer-readable storage medium of claim 78 wherein the computer program includes instructions for causing the computer system to form multiple instances of at least some of the computation graphs.

93. The computer-readable storage medium of claim 78 wherein the computer program includes instructions for causing the computer system to identify that an error has occurred in the performing of a computation for one of the transactions, and continue the performing of a computation for another one of the transactions.

94. The computer-readable storage medium of claim 78 wherein the processing of a first transaction of the plurality of transactions starts at a first time, and the processing of a second transaction of the plurality of transactions starts at a second time later than the first time, and wherein the computer program includes instructions for causing the computer system to complete the performing of the computation for the second transaction before completing the performing of the computation for the first transaction.

95. A non-transitory computer-readable storage medium storing a computer program for processing graph-based computations, the computer program including instructions for causing a computer system to:
within a computation graph including vertices representing work element-handling graph components that process work elements according to links joining the vertices,
provide at least one error-handling graph component within the computation graph, the at least one error-handling graph component distinct from the work element-handling graph components and configured to provide error information to a process external to the graph, and
process data, including, in response to a work element-handling graph component encountering an error while processing, redirecting processing to the error-handling graph component; and
direct at least some of the work elements to the error-handling graph component according to at least one link to a vertex representing the error-handling graph component.

96. The computer-readable storage medium of claim 95 in which redirecting processing to the error-handling graph component includes removing work elements from at least one input queue.

97. The computer-readable storage medium of claim 95 in which redirecting processing to the error-handling graph component includes processing the work elements directed to the error-handling graph component.

98. The computer-readable storage medium of claim 97 in which processing the work elements directed to the error-handling graph component includes rolling back changes to a database made prior to the error.

99. The computer-readable storage medium of claim 98 in which if output provided by the sub-graph indicates that an error occurred in the sub graph, redirecting processing to the error-handling graph component.

100. The computer-readable storage medium of claim 97 in which processing the data includes, for graph components not included in handling the error, discarding work elements directed to those graph components.

101. The computer-readable storage medium of claim 95 wherein the computer program includes instructions for causing the computer system to provide a sub-graph, the sub-graph including an error-handling sub-graph component configured to provide an error code as an output of the sub-graph.

102. The computer-readable storage medium of claim 95 in which redirecting processing to the error-handling graph component includes communicating, from the graph component that encountered the error, to the error-handling graph component, work elements that the graph component was processing when the error occurred.

103. The computer-readable storage medium of claim 102 in which the work elements are communicated according to the link to the vertex representing the error-handling component.

104. The computer-readable storage medium of claim 102 in which redirecting processing to the error-handling graph component includes communicating, from the graph component that encountered the error, to the error-handling graph component, reporting information about the error.

105. The computer-readable storage medium of claim 104 in which the reporting information is communicated according to an implicit connection between the graph component that encountered the error and the error-handling component.

106. The computer-readable storage medium of claim 105 wherein the computer program includes instructions for causing the computer system to reveal the implicit connection as an explicit link between a vertex representing the graph component that encountered the error and a vertex representing the error-handling component in response to a user request.

107. The computer-readable storage medium of claim 95 in which providing the error-handling graph component includes providing a plurality of error-handling graph components, and redirecting processing to the error-handling graph component includes selecting an error-handling graph component based on output provided from the graph component that encountered the error.

108. The computer-readable storage medium of claim 95 in which processing the data also includes, if a graph component encounters an error while processing, outputting an identification of a work element that caused the error.

109. The computer-readable storage medium of claim 95 in which processing includes:
    enabling a first component of the computation graph;
    disabling the error-handling component; and
    for each component downstream of the first component other than the error-handling component, enabling the component if a component immediately upstream of the component is enabled.

110. The computer-readable storage medium of claim 109 in which redirecting processing to the error-handling graph component includes:
    stopping execution of each enabled graph component,
    disabling the component that encountered the error;
    enabling the error-handling component;
    disabling components downstream of the component that encountered the error that are not downstream of the error-handling component; and
    enabling components upstream of the error-handling component.

111. The computer-readable storage medium of claim 95 in which redirecting processing to the error-handling graph component includes, where the error occurred in a first component,
    if the error occurs under a first condition, directing process flow from the first component to a first error-handling component upstream of the first component,
    and if the error occurs under a second condition, directing process flow from the first component to a second error-handling component downstream of the first component.

112. The computer-readable storage medium of claim 111 in which the first condition is that a counter is below a limit.

113. The computer-readable storage medium of claim 111 in which the second condition is that a counter is above a limit.

114. The computer-readable storage medium of claim 111 in which redirecting processing to the error-handling graph component also includes enabling a set of graph components, the set having been determined prior to the error.

* * * * *